US008547079B2

(12) United States Patent
Socheat

(10) Patent No.: US 8,547,079 B2

(45) Date of Patent: Oct. 1, 2013

(54) VOLTAGE REGULATOR CAPABLE OF ENABLING OVERCURRENT PROTECTION IN A STATE IN WHICH AN OUTPUT CURRENT IS LARGE

(75) Inventor: Heng Socheat, Chiba (JP)

(73) Assignee: Seiko Instruments Inc., Chiba (JP)

(*) Notice: Subject to any disclaimer, the term of this patent is extended or adjusted under 35 U.S.C. 154(b) by 73 days.

(21) Appl. No.: 13/361,084

(22) Filed: Jan. 30, 2012

(65) Prior Publication Data

US 2012/0194147 A1 Aug. 2, 2012

(30) Foreign Application Priority Data

Feb. 1, 2011 (JP) ................................. 2011-020106

(51) Int. Cl.

| | |
|---|---|
| ***G05F 1/00*** | (2006.01) |
| ***H02H 7/00*** | (2006.01) |
| ***H02H 9/00*** | (2006.01) |
| ***H02H 3/08*** | (2006.01) |
| ***H02H 9/02*** | (2006.01) |
| ***H02H 9/08*** | (2006.01) |

(52) U.S. Cl.

USPC ............. 323/284; 323/275; 323/282; 361/18; 361/93.1; 361/93.7; 361/93.9

(58) Field of Classification Search

USPC ................... 323/274, 275, 282, 284; 361/18, 361/93.1, 93.7, 93.9

See application file for complete search history.

(56) References Cited

U.S. PATENT DOCUMENTS

| | | | | |
|---|---|---|---|---|
| 6,801,419 | B2 * | 10/2004 | Fukui | 361/93.1 |
| 7,233,462 | B2 * | 6/2007 | Kanakubo | 361/18 |
| 7,411,376 | B2 * | 8/2008 | Zhang | 323/277 |
| 7,646,574 | B2 * | 1/2010 | Imura | 361/93.1 |
| 2005/0029999 | A1 * | 2/2005 | Fukui | 323/285 |
| 2006/0133000 | A1 * | 6/2006 | Kimura | 361/93.1 |
| 2008/0197829 | A1 * | 8/2008 | Nagata et al. | 323/316 |
| 2009/0189584 | A1 * | 7/2009 | Suzuki | 323/284 |
| 2009/0206807 | A1 * | 8/2009 | Imura et al. | 323/277 |
| 2010/0213909 | A1 * | 8/2010 | Nakashimo | 323/282 |

FOREIGN PATENT DOCUMENTS

JP 2010-218543 A 9/2010

* cited by examiner

*Primary Examiner* — Adolf Berhane
*Assistant Examiner* — Gary Nash
(74) *Attorney, Agent, or Firm* — Brinks Hofer Gilson & Lione

(57) ABSTRACT

Provided is a voltage regulator capable of enabling overcurrent protection in a state in which an output current is large even if an input/output voltage difference is small, without waiting until the output voltage decreases. A sense current that a sense transistor flows is detected by a differential amplifier circuit, and hence, in the state in which the input/output voltage difference is small and the output current is large, the overcurrent protection can be enabled even when the output voltage does not decrease. Further, a good fold-back characteristic can be obtained.

3 Claims, 3 Drawing Sheets

VOLTAGE REGULATOR CAPABLE OF ENABLING OVERCURRENT PROTECTION IN A STATE IN WHICH AN OUTPUT CURRENT IS LARGE

RELATED APPLICATIONS

This application claims priority under 35 U.S.C. §119 to Japanese Patent Application No. 2011-020106 filed on Feb. 1, 2011, the entire content of which is hereby incorporated by reference

BACKGROUND OF THE INVENTION

1. Field of the Invention

The present invention relates to an overcurrent protection circuit for a voltage regulator.

2. Description of the Related Art

A conventional voltage regulator is described. FIG. 3 is a circuit diagram illustrating the conventional voltage regulator.

The conventional voltage regulator includes a reference voltage circuit 101, a differential amplifier circuit 102, a PMOS transistor 105 serving as an output transistor, an overcurrent protection circuit 361, resistors 107 and 108, a ground terminal 100, an output terminal 121, and a power supply terminal 150. The overcurrent protection circuit 361 includes NMOS transistors 132, 133, and 138, a PMOS transistor 131 serving as a sense transistor, and PMOS transistors 134, 135, 136, and 137.

The differential amplifier circuit 102 has an inverting input terminal connected to the reference voltage circuit 101 and a non-inverting input terminal connected to a connection point between the resistors 107 and 108. The PMOS transistor 131 has a gate connected to an output terminal of the differential amplifier circuit 102 and a source connected to the power supply terminal 150. The NMOS transistor 132 has a gate and a drain which are connected to a drain of the PMOS transistor 131, and a source connected to the ground terminal 100. The NMOS transistor 133 has a gate connected to the gate of the NMOS transistor 132 and a source connected to the ground terminal 100. The PMOS transistor 134 has a source connected to the power supply terminal 150 and a gate and a drain which are connected to a drain of the NMOS transistor 133.

The PMOS transistor 135 has a gate connected to the gate of the PMOS transistor 134, a drain connected to the output terminal of the differential amplifier circuit 102, and a source connected to the power supply terminal 150. The NMOS transistor 138 has a gate connected to the gate of the NMOS transistor 132 and a source connected to the output terminal 121. The PMOS transistor 136 has a gate and a drain which are connected to a drain of the NMOS transistor 138, and a source connected to the power supply terminal 150. The PMOS transistor 137 has a gate connected to the gate of the PMOS transistor 136, a drain connected to the output terminal of the differential amplifier circuit 102, and a source connected to the power supply terminal 150. The PMOS transistor 105 has a gate connected to the output terminal of the differential amplifier circuit 102, a source connected to the power supply terminal 150, and a drain connected to the output terminal 121.

The resistor 107 and the resistor 108 are connected between the output terminal 121 and the ground terminal 100 (see, for example, Japanese Patent Application Laid-open No. 2010-218543).

The conventional voltage regulator operates as follows to protect the circuit from an overcurrent. If the output terminal and the ground terminal of the voltage regulator are short-circuited, an output current Iout increases. When the output current Iout increases, a current flowing through the sense transistor 131 also increases, and a current flowing through the NMOS transistor 132 also increases. A current flowing through the NMOS transistor 133, which is current-mirror-connected to the NMOS transistor 132, also increases, and a current flowing through the PMOS transistor 134 also increases. The ON-state resistance of the PMOS transistor 135, which is current-mirror-connected to the PMOS transistor 134, decreases, and a gate-source voltage of the output transistor 105 decreases so that the output transistor 105 is gradually turned OFF. Accordingly, the output current Iout reduces, and an output voltage Vout decreases.

When the output voltage Vout decreases to be equal to or lower than a predetermined voltage, a gate-source voltage of the NMOS transistor 138 becomes equal to or higher than a threshold voltage, and the NMOS transistor 138 is turned ON. Then, a current flowing through the PMOS transistor 136 increases, and the ON-state resistance of the PMOS transistor 137, which is current-mirror-connected to the PMOS transistor 136, decreases. The gate-source voltage of the output transistor 105 further decreases, and the output transistor 105 is further turned OFF. Accordingly, the output current Iout further reduces and becomes a short-circuit output current Is. After that, the output voltage Vout further decreases to be 0 volts.

In the conventional technology, however, when an input/output voltage difference is small, the overcurrent protection is not enabled unless the output voltage reduces to a certain level, and hence there has been a problem in that a connected IC is broken by an overcurrent. Further, the amount of reduction of the output voltage cannot be controlled, and hence there has been another problem in that a good fold-back characteristic is difficult to obtain.

SUMMARY OF THE INVENTION

The present invention has been made in view of the above-mentioned problems, and provides a voltage regulator capable of enabling overcurrent protection in a state in which an output current is large even if an input/output voltage difference is small, without waiting until the output voltage decreases, to thereby obtain a good fold-back characteristic.

A voltage regulator including an overcurrent protection circuit of the present invention includes: a reference voltage circuit for outputting a reference voltage; an output transistor; a first differential amplifier circuit for amplifying and outputting a difference between the reference voltage and a divided voltage obtained by dividing a voltage output by the output transistor, to thereby control a gate of the output transistor; and an overcurrent protection circuit for protecting the voltage regulator from an overcurrent of an output current of the output transistor, in which the overcurrent protection circuit includes: a sense transistor for sensing the output current; a first transistor including a drain connected to a drain of the sense transistor; a second differential amplifier circuit including an output terminal connected to a gate of the first transistor, an inverting input terminal connected to a source of the first transistor, and a non-inverting input terminal connected to a non-inverting input terminal of the first differential amplifier circuit; a first resistor connected to the source of the first transistor; and a control circuit for controlling the gate of the output transistor based on a current flowing through the sense transistor.

According to the voltage regulator including the overcurrent protection circuit of the present invention, the differential amplifier circuit is used in the overcurrent protection circuit. Therefore, in the state in which the output current is large and the input/output voltage difference is small, the overcurrent protection can be enabled even if the output voltage does not reduce. Further, a good fold-back characteristic can be obtained.

DETAILED DESCRIPTION OF THE PREFERRED EMBODIMENTS

Referring to the accompanying drawings, embodiments of the present invention are described.

First Embodiment

Figure 1:
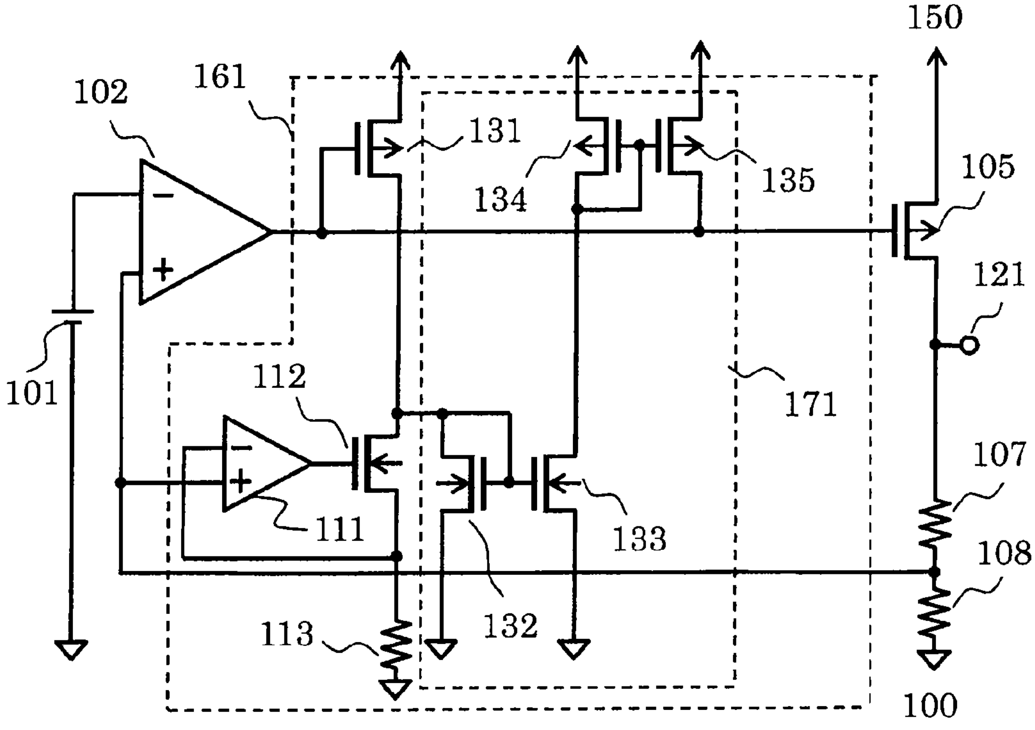
FIG. 1 is a circuit diagram illustrating a voltage regulator according to a first embodiment of the present invention.

FIG. 1 is a circuit diagram of a voltage regulator according to a first embodiment of the present invention.

The voltage regulator of the first embodiment includes a reference voltage circuit 101, a differential amplifier circuit 102, an overcurrent protection circuit 161, a PMOS transistor 105 serving as an output transistor, resistors 107 and 108, a ground terminal 100, an output terminal 121, and a power supply terminal 150. The overcurrent protection circuit 161 includes a PMOS transistor 131 serving as a sense transistor, a differential amplifier circuit 111, an NMOS transistor 112, a resistor 113, and a control circuit 171. The control circuit 171 includes PMOS transistors 134 and 135 and NMOS transistors 132 and 133.

The differential amplifier circuit 102 has an inverting input terminal connected to the reference voltage circuit 101, a non-inverting input terminal connected to a connection point between the resistors 107 and 108, and an output terminal connected to a gate of the PMOS transistor 105. The PMOS transistor 131 has a gate connected to the output terminal of the differential amplifier circuit 102 and a source connected to the power supply terminal 150. The NMOS transistor 132 has a gate and a drain which are connected to a drain of the PMOS transistor 131, and a source connected to the ground terminal 100. The NMOS transistor 133 has a gate connected to the gate of the NMOS transistor 132 and a source connected to the ground terminal 100. The PMOS transistor 134 has a drain and a gate which are connected to a drain of the NMOS transistor 133, and a source connected to the power supply terminal 150. The PMOS transistor 135 has a gate connected to the gate of the PMOS transistor 134, a drain connected to the output terminal of the differential amplifier circuit 102, and a source connected to the power supply terminal 150. The PMOS transistor 105 has a source connected to the power supply terminal 150 and a drain connected to the output terminal 121. The resistor 107 and the resistor 108 are connected between the output terminal 121 and the ground terminal 100. The differential amplifier circuit 111 has a non-inverting input terminal connected to the non-inverting input terminal of the differential amplifier circuit 102, an inverting input terminal connected to a source of the NMOS transistor 112, and an output terminal connected to a gate of the NMOS transistor 112. The NMOS transistor 112 has a drain connected to the drain of the PMOS transistor 131. The resistor 113 is connected between the source of the NMOS transistor 112 and the ground terminal 100.

Next, an operation of the voltage regulator of the first embodiment is described.

The resistors 107 and 108 output a divided voltage Vfb by dividing an output voltage Vout, which is a voltage at the output terminal 121. The differential amplifier circuit 102 compares the divided voltage Vfb with an output voltage Vref of the reference voltage circuit 101 to control a gate voltage of the PMOS transistor 105, which operates as an output transistor, so that the output voltage Vout becomes constant. When the output voltage Vout is higher than a predetermined voltage, the divided voltage Vfb is higher than the reference voltage Vref. Then, an output signal of the differential amplifier circuit 102 (gate voltage of the PMOS transistor 105) becomes higher to gradually turn OFF the PMOS transistor 105, and the output voltage Vout decreases. In this way, the output voltage Vout is controlled to be constant. On the other hand, when the output voltage Vout is lower than the predetermined voltage, an operation reverse to the above-mentioned operation is performed to increase the output voltage Vout. In this way, the output voltage Vout is controlled to be constant. The divided voltage Vfb is output as a constant voltage, and hence the differential amplifier circuit 111 outputs Hi, and the NMOS transistor 112 is maintained to be in the ON-state.

When the output terminal 121 and the ground terminal 100 are short-circuited, an output current Iout increases. When the output current Iout becomes an overcurrent state exceeding a maximum output current Im, a current flowing through the PMOS transistor 131, which is current-mirror-connected to the PMOS transistor 105 and senses the output current, increases. Then, a current flowing through the NMOS transistor 132 also increases, a current flowing through the NMOS transistor 133, which is current-mirror-connected to the NMOS transistor 132, also increases, and a current flowing through the PMOS transistor 134 also increases. Then, the ON-state resistance of the PMOS transistor 135, which is current-mirror-connected to the PMOS transistor 134, decreases, and a gate-source voltage of the PMOS transistor 105 decreases so that the PMOS transistor 105 is gradually turned OFF. Accordingly, the amount of the output current Iout flowing does not exceed the maximum output current Im, and the output voltage Vout decreases. On this occasion, due to the current flowing through the NMOS transistor 133, the gate-source voltage of the PMOS transistor 105 decreases to gradually turn OFF the PMOS transistor 105 so that the output current Iout is fixed to the maximum output current Im. Therefore, the maximum output current Im is determined by the current flowing through the NMOS transistor 133.

When the output terminal 121 and the ground terminal 100 are short-circuited, the output voltage Vout falls and the divided voltage Vfb falls. If the divided voltage Vfb falls, an output voltage of the differential amplifier circuit 111 gradually decreases to gradually turn OFF the NMOS transistor 112. Then, a current flowing through the NMOS transistor 112 gradually reduces, and the current flowing through the NMOS transistor 132 gradually increases. Then, the current flowing through the current-mirror-connected NMOS transistor 133 gradually increases, and the current flowing through the PMOS transistor 134 also gradually increases. In this way, the ON-state resistance of the PMOS transistor 135 can be reduced, and the gate-source voltage of the PMOS transistor 105 can be reduced to gradually turn OFF the PMOS transistor 105.

As described above, the NMOS transistor 112 can be gradually turned OFF due to the decrease in the output voltage, and hence the overcurrent protection can be enabled in the state in which the output current is large, without waiting until the output voltage decreases. Further, such a good fold-back characteristic that a connected IC is not broken by an overcurrent can be obtained.

Second Embodiment

Figure 2:
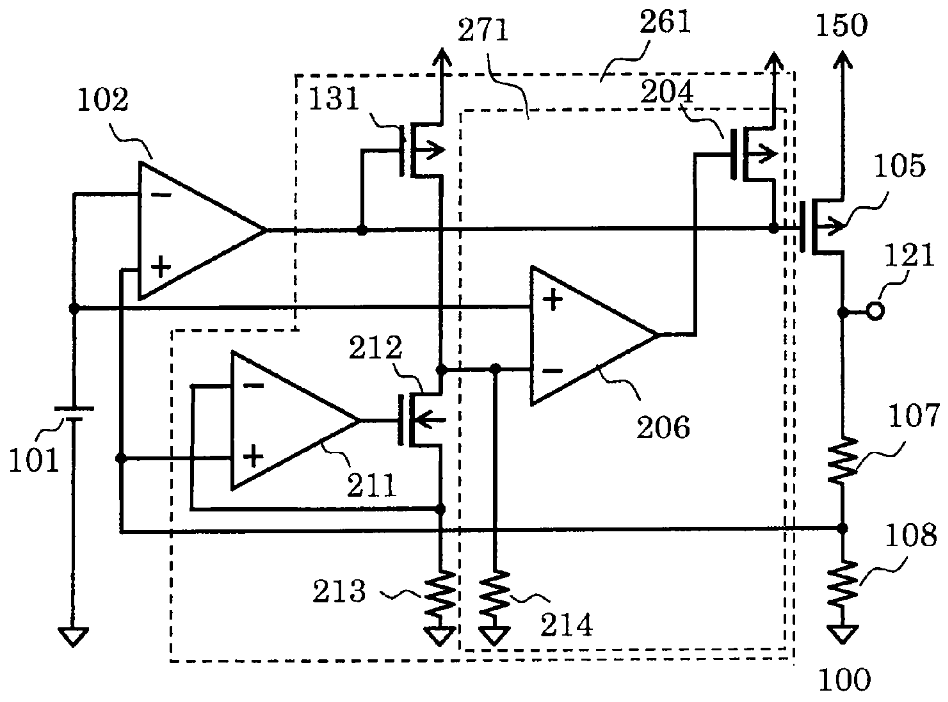
FIG. 2 is a circuit diagram illustrating a voltage regulator according to a second embodiment of the present invention.
Figure 3:
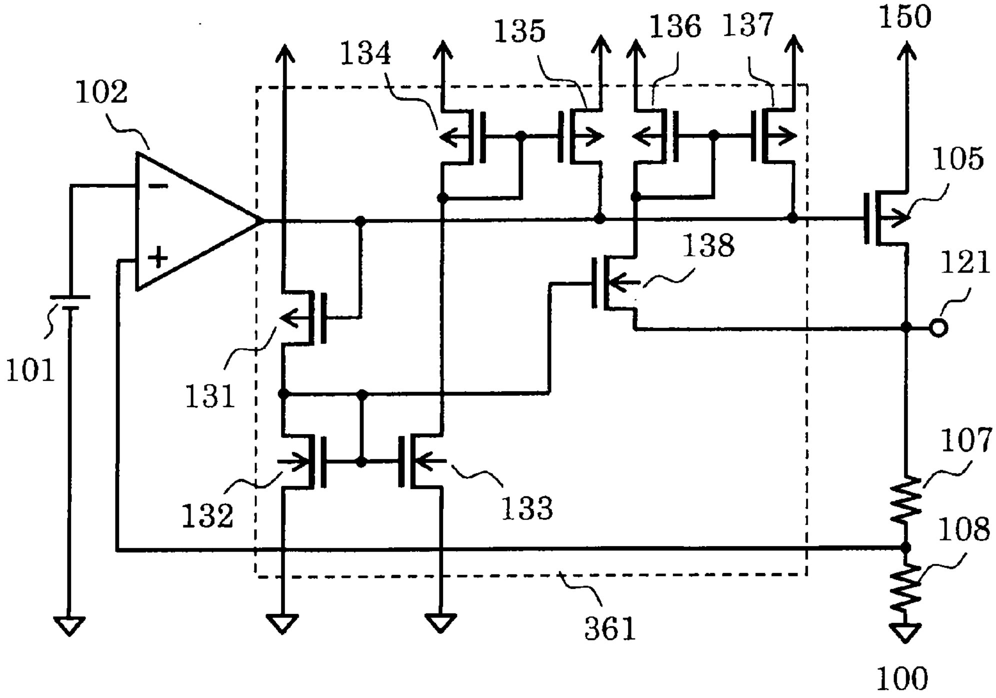
FIG. 3 PRIOR ART
FIG. 3 is a circuit diagram illustrating a conventional voltage regulator.

FIG. 2 is a circuit diagram of a voltage regulator according to a second embodiment of the present invention.

The voltage regulator of the second embodiment includes a reference voltage circuit 101, a differential amplifier circuit 102, an overcurrent protection circuit 261, a PMOS transistor 105, resistors 107 and 108, a ground terminal 100, an output terminal 121, and a power supply terminal 150. The overcurrent protection circuit 261 includes a PMOS transistor 131, a differential amplifier circuit 211, an NMOS transistor 212, a resistor 213, and a control circuit 271. The control circuit 271 includes a PMOS transistor 204, a differential amplifier circuit 206, and a resistor 214.

The differential amplifier circuit 102 has an inverting input terminal connected to the reference voltage circuit 101, a non-inverting input terminal connected to a connection point between the resistors 107 and 108, and an output terminal connected to a gate of the PMOS transistor 105. The PMOS transistor 131 has a gate connected to an output terminal of the differential amplifier circuit 102 and a source connected to the power supply terminal 150. The differential amplifier circuit 211 has a non-inverting input terminal connected to the non-inverting input terminal of the differential amplifier circuit 102, an inverting input terminal connected to a source of the NMOS transistor 212, and an output terminal connected to a gate of the NMOS transistor 212. The differential amplifier circuit 206 has a non-inverting input terminal connected to the inverting input terminal of the differential amplifier circuit 102, an inverting input terminal connected to a drain of the NMOS transistor 212, and an output terminal connected to a gate of the PMOS transistor 204. The resistor 213 is connected between the source of the NMOS transistor 212 and the ground terminal 100. The resistor 214 is connected between the inverting input terminal of the differential amplifier circuit 206 and the ground terminal 100. The PMOS transistor 204 has a drain connected to the output terminal of the differential amplifier circuit 102 and a source connected to the power supply terminal 150. The PMOS transistor 105 has a source connected to the power supply terminal 150 and a drain connected to the output terminal 121. The resistor 107 and the resistor 108 are connected between the output terminal 121 and the ground terminal 100.

Next, an operation of the voltage regulator of the second embodiment is described.

The resistors 107 and 108 output a divided voltage Vfb by dividing an output voltage Vout, which is a voltage at the output terminal 121. The differential amplifier circuit 102 compares the divided voltage Vfb with an output voltage Vref of the reference voltage circuit 101 to control a gate voltage of the PMOS transistor 105, which operates as an output transistor, so that the output voltage Vout becomes constant. When the output voltage Vout is higher than a predetermined voltage, the divided voltage Vfb is higher than the reference voltage Vref. Then, an output signal of the differential amplifier circuit 102 (gate voltage of the PMOS transistor 105) becomes higher to gradually turn OFF the PMOS transistor 105, and the output voltage Vout decreases. In this way, the output voltage Vout is controlled to be constant. On the other hand, when the output voltage Vout is lower than the predetermined voltage, an operation reverse to the above-mentioned operation is performed to increase the output voltage Vout. In this way, the output voltage Vout is controlled to be constant. The divided voltage Vfb is output as a constant voltage, and hence the differential amplifier circuit 211 outputs Hi, and the NMOS transistor 212 is maintained to be in the ON-state.

When the output terminal 121 and the ground terminal 100 are short-circuited, an output current Iout increases. When the output current Iout becomes an overcurrent state exceeding a maximum output current Im, a current flowing through the PMOS transistor 131, which is current-mirror-connected to the PMOS transistor 105 and senses the output current, increases. Then, a voltage at the inverting input terminal of the differential amplifier circuit 206 rises. When the voltage at the inverting input terminal of the differential amplifier circuit 206 exceeds the voltage of the reference voltage circuit 101, a voltage at the output terminal of the differential amplifier circuit 206 gradually decreases to gradually turn ON the PMOS transistor 204. In this way, the gate of the PMOS transistor 105 is gradually set to a voltage at the power supply terminal 150 so that the PMOS transistor 105 is turned OFF, to thereby enable protection against the overcurrent state.

When the output terminal 121 and the ground terminal 100 are short-circuited, the output voltage Vout falls and the divided voltage Vfb falls. If the divided voltage Vfb falls, an output voltage of the differential amplifier circuit 211 gradually decreases to gradually turn OFF the NMOS transistor 212. Then, a current flowing through the NMOS transistor 212 gradually reduces, and a current flowing through the resistor 214 gradually increases. In this way, the voltage at the inverting input terminal of the differential amplifier circuit 206 can be increased due to the decrease in the output voltage, and the PMOS transistor 204 is gradually turned ON by the differential amplifier circuit 206 so that the PMOS transistor 105 is gradually turned OFF, to thereby enable protection against the overcurrent state.

The differential amplifier circuit 206 compares the voltage of the reference voltage circuit 101 and the voltage generated across the resistor 214, and hence, by adjusting the resistance of the resistor 214, it is possible to freely set a point at which the overcurrent protection is enabled.

Note that, although not illustrated, another reference voltage circuit may be connected to the differential amplifier circuit 206. In this case, also by adjusting the voltage value thereof, it is possible to freely set a point at which the overcurrent protection is enabled.

As described above, the NMOS transistor 212 is gradually turned OFF due to the decrease in the output voltage, and hence the overcurrent protection can be enabled in the state in which the output current is large, without waiting until the output voltage decreases. Further, such a good fold-back characteristic that a connected IC is not broken by an overcurrent can be obtained. In addition, the point at which the overcurrent protection is enabled can be freely set.

What is claimed is:

1. A voltage regulator, comprising:
   - a reference voltage circuit for outputting a reference voltage;
   - an output transistor;
   - a first differential amplifier circuit for amplifying and outputting a difference between the reference voltage and a divided voltage obtained by dividing a voltage output by the output transistor, to thereby control a gate of the output transistor; and an overcurrent protection circuit for protecting the voltage regulator from an overcurrent of an output current of the output transistor, wherein the overcurrent protection circuit comprises:

a sense transistor for sensing the output current;

a first transistor including a drain connected to a drain of the sense transistor;

a second differential amplifier circuit including an output terminal connected to a gate of the first transistor, an inverting input terminal connected to a source of the first transistor, and a non-inverting input terminal connected to a non-inverting input terminal of the first differential amplifier circuit;

a first resistor connected to the source of the first transistor; and a control circuit for controlling the gate of the output transistor based on a current flowing through the sense transistor.

2. A voltage regulator according to claim 1, wherein the control circuit comprises:

a second transistor including a gate and a drain which are connected to the drain of the sense transistor;

a third transistor which is current-mirror-connected to the second transistor;

a fourth transistor including a gate and a drain which are connected to a drain of the third transistor; and a fifth transistor which is current-mirror-connected to the fourth transistor and includes a drain connected to the gate of the output transistor.

3. A voltage regulator according to claim 1, wherein the control circuit comprises:

a third differential amplifier circuit including a non-inverting input terminal connected to the reference voltage circuit and an inverting input terminal connected to the drain of the sense transistor;

a second resistor connected to the inverting input terminal of the third differential amplifier circuit; and a second transistor including a gate connected to an output terminal of the third differential amplifier circuit and a drain connected to the gate of the output transistor.

* * * * *